US010299276B2

United States Patent
Sugatoor et al.

(10) Patent No.: US 10,299,276 B2
(45) Date of Patent: *May 21, 2019

(54) NETWORK DEPLOYMENT (71) Applicant: HEWLETT PACKARD ENTERPRISE DEVELOPMENT LP, Houston, TX (US)

(72) Inventors: Manaswini Lakshmikanth Sugatoor, Bangalore (IN); Ataur Rehman, District Ballia (IN); Gopal Agarwal, Bangalore (IN); Brijesh Kumar Yadav, Bangalore (IN); Manas Sharma, Bangalore (IN); Abhishek Mishra, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/017,200

(22) Filed: Jun. 25, 2018

(65) Prior Publication Data

US 2018/0310185 A1    Oct. 25, 2018

Related U.S. Application Data

(63) Continuation of application No. 15/458,594, filed on Mar. 14, 2017, now Pat. No. 10,009,775.

(51) Int. Cl.
*H04W 40/00* (2009.01)
*H04W 72/04* (2009.01)
(Continued)

(52) U.S. Cl.
CPC ......... *H04W 72/048* (2013.01); *H04W 16/00* (2013.01); *H04W 16/18* (2013.01);
(Continued)

(58) Field of Classification Search
CPC ... H04W 16/14; H04W 16/00; H04W 72/048; H04W 88/02; H04W 6/245; H04W 84/12;
(Continued)

(56) References Cited

U.S. PATENT DOCUMENTS 8,160,975 B2    4/2012 Tang et al.
8,204,035 B2 *  6/2012 Rausch .................. H04L 12/66
                                                    370/350

(Continued)

OTHER PUBLICATIONS

Davya, M. et al.; "An Online Support Vector Machine for Abnormal Events Detection"; Sep. 7, 2005; 17 pages.

*Primary Examiner* — Danh C Le
(74) *Attorney, Agent, or Firm* — Brooks, Cameron & Huebsch (57) ABSTRACT

Example implementations relate to network deployment of devices. For example, a non-transitory computer readable medium storing instructions executable by a processing resource can determine a plurality of deployment thresholds of a plurality of devices, wherein the plurality of deployment thresholds are associated with a type of the plurality of devices. The instructions can cause the processing resource to monitor deployment data associated with the plurality of devices to identify a device with a deployment outlier. The device with the deployment outlier is a device with deployment data that is outside a deployment threshold of the device. The instructions can cause the processing resource to adjust the deployment threshold of the device based on the monitoring.

20 Claims, 6 Drawing Sheets (51) Int. Cl.
- *H04W 16/00* (2009.01)
- *H04W 16/18* (2009.01)
- *H04W 84/12* (2009.01)
- *G06F 8/61* (2018.01)
- *H04L 29/12* (2006.01)
- *H04L 29/08* (2006.01)
- *H04W 24/02* (2009.01)

(52) U.S. Cl.
CPC ............ *G06F 8/61* (2013.01); *H04L 61/1511* (2013.01); *H04L 61/2015* (2013.01); *H04L 67/34* (2013.01); *H04W 24/02* (2013.01); *H04W 84/12* (2013.01)

(58) Field of Classification Search
CPC ...... G06F 8/61; H04L 67/34; H04M 1/72522; H04M 1/72519; G08C 17/02
USPC ........................ 455/448, 550.1, 418; 340/328
See application file for complete search history.

(56) References Cited

U.S. PATENT DOCUMENTS

| | | | |
|---|---|---|---|
| 8,457,928 B2 | 6/2013 | Dang et al. | |
| 8,516,104 B1 | 8/2013 | Liu et al. | |
| 8,867,378 B2 | 10/2014 | Balasubramanian | |
| 9,032,388 B1 | 5/2015 | Watson | |
| 9,471,778 B1 | 10/2016 | Seo et al. | |
| 9,970,405 B2* | 5/2018 | Garrard | F02P 9/005 |
| 2012/0307699 A1* | 12/2012 | Lindoff | H04W 52/0206 370/311 |
| 2013/0328697 A1 | 12/2013 | Lundy | |
| 2014/0164585 A1* | 6/2014 | Shaw | H04L 41/5025 709/223 |
| 2014/0165091 A1 | 6/2014 | Abhyanker | |
| 2014/0280220 A1 | 9/2014 | Spakes | |
| 2015/0199191 A1 | 7/2015 | Bhasin et al. | |
| 2015/0233975 A1 | 8/2015 | Itaya | |
| 2015/0351118 A1* | 12/2015 | Arnott | H04W 16/14 370/252 |
| 2016/0092196 A1 | 3/2016 | Kuchibhotla et al. | |
| 2016/0163186 A1 | 6/2016 | Davidson | |
| 2016/0232719 A1 | 8/2016 | Bring | |
| 2016/0358444 A1* | 12/2016 | Lundy | G08C 17/02 |
| 2016/0360537 A1* | 12/2016 | Palenius | H04W 48/08 |
| 2017/0019795 A1 | 1/2017 | Takahashi | |
| 2017/0023630 A1 | 1/2017 | Zettler | |
| 2017/0181006 A1* | 6/2017 | Vardarajan | H04W 16/20 |
| 2017/0181036 A1* | 6/2017 | Ou | H04W 48/02 |
| 2018/0145906 A1* | 5/2018 | Yadav | H04L 45/70 |

* cited by examiner

NETWORK DEPLOYMENT

CROSS-REFERENCE TO RELATED APPLICATIONS

This application is a continuation of co-pending U.S. patent application Ser. No. 15/458,594, filed Mar. 14, 2017, the entire contents of which are hereby incorporated by reference as though fully set forth herein.

BACKGROUND

A network device referred to as an access point ("AP") can be a wireless networking device used to allow Wi-Fi compliant devices to connect to a wired network. An AP can connect to a router via the wired network as a standalone device. An AP can be coupled to a wired network and provide wireless access to a number of clients. A network device can be managed and/or monitored by a controller that controls automatic adjustments of power, channels, authentication, and/or security.

DETAILED DESCRIPTION

Wireless networks can provide various types of communication to multiple users wirelessly through the use of electromagnetic waves. As a result, various types of communication may be provided to multiple users without cables, wires, or other physical electric conductors to couple devices in the wireless network. Examples of the various types of communication that may be provided by wireless networks include voice communication, data communication, multimedia services, etc.

An example of a wireless network is a wireless local area network (WLAN). As used herein, 'wireless local area network' (WLAN) can, for example, refer to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network. WLANs may include multiple stations (STAs) and/or network devices referred to as access points (APs) that may communicate over a plurality of wireless channels. An STA is a device that has the capability to use the Institute of Electrical and Electronics Engineers (IEEE) 802.11 protocol. Examples of STAs include smart phones, laptops, physical non-virtualized computing devices, personal digital assistants, etc. In some examples, a STA may be a device that contains an IEEE 802.11-conformant media access control (MAC) and physical layer (PHY) interface to a wireless medium (WM).

Wireless networks such as WLANs can use one or more wireless communication technologies. For example, WLANs can use orthogonal frequency division multiplexing (OFDM). In an OFDM based wireless network, a data stream is split into multiple data substreams. Such data substreams may be sent over different OFDM subcarriers, which can be referred to as tones or frequency tones. Some wireless networks may use a single-in-single-out (SISO) communication approach, where each STA and/or AP uses a single antenna. Other wireless networks may use a multiple-in-multiple-out (MIMO) communication approach, where a STA and/or AP uses multiple transmit antennas and multiple receive antennas. WLANs such as those defined in the IEEE wireless communications standards (e.g., IEEE 802.11a, IEEE 802.11n, IEEE 802.11ac, etc.) can use OFDM to transmit and receive signals. Moreover, WLANs, such as those based on the IEEE 802.11n or IEEE 802.11ac standards, can use OFDM and MIMO.

As used herein, an AP is a networking hardware device that allows a wireless-compliant device (e.g., a STA) to connect to a network. As an example, 'access point' (AP) can refer to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as ROM, EPROM, and Flash memory A network device such as an access point (AP) may provide connectivity with a network such as the internet to the STAs. As used herein, 'network device' can, for example, refer to a device that is adapted to transmit and/or receive signaling and to process information within such signaling such as a station (e.g., any data processing equipment such as a computer, cellular phone, personal digital assistant, table devices, etc.), an AP, data transfer devices (such as network switches, routers, controllers, etc.) or the like. As used herein, the term "router" can, for example, refer to a networking device that forwards data packets between networks. As used herein, the term "switch" can, for example, refer to a computer networking device that connects devices together on a network by using, for example, packet switching to receive, process and forward data to a destination device. For example, a switch can include memory, including read-write memory, and a hierarch of persistent memory such as ROM, EPROM, and Flash memory.

An AP can be coupled to a wired network and provide wireless access to a number of clients. An AP can be managed and/or monitored by a controller that controls automatic adjustments of power, channels, authentication, and/or security. A common public application of an AP can be referred to as a hotspot where a wireless client can connect to the internet independent of being aware of which particular network the wireless client is attached to. This can be beneficial for staying continually connected to the internet while moving around from location to location.

A device (e.g., a network device) can be deployed in a network. A number of deployment characteristics can be associated with deploying a device in a network. For example, a device can be deployed into the network over a period of time. The period of time can depend on the type of network, a type of server associated with the network, and/or a type of the device being deployed into the network. The type of device can include a station such as an AP, servers (such as radius, DHCP, DNS), switches, and/or controllers. Deploying a plurality of devices in a timely fashion can be beneficial to running the network and/or dynamically updating the network to run more efficiently.

A deployment threshold that indicates a minimum amount of time that a device should take to be deployed into a network can be determined. The deployment threshold for a particular device can be based on the type of device, the type of server in the network the device is deployed into, and/or additional network deployment characteristics. By determining a deployment threshold, a device that is below the threshold (or taking too long to be deployed) can be indicated and adjustments can be made to the network and/or a plurality of deployment thresholds in order to insure the network is running properly.

Figure 1:
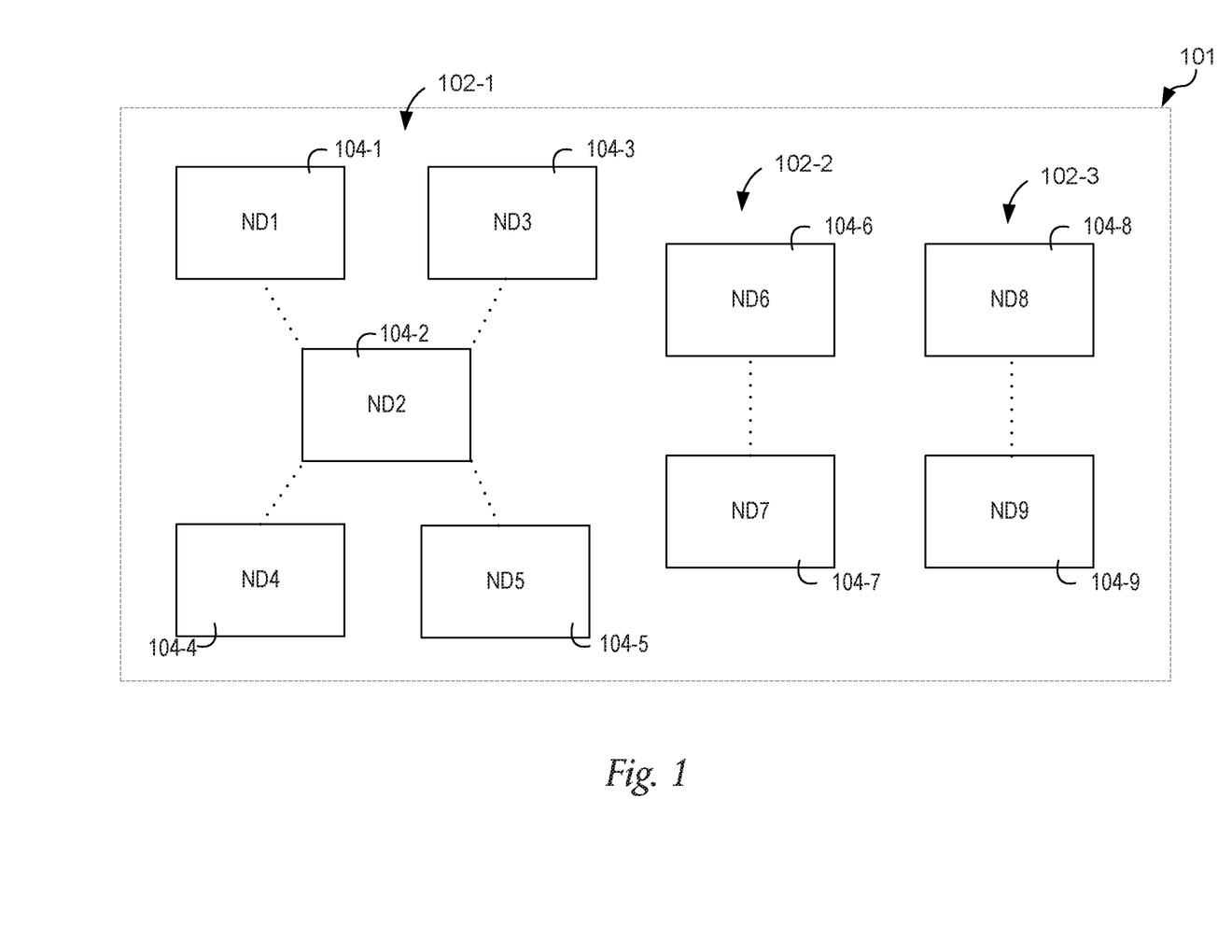
FIG. 1 illustrates an example network deployment consistent with the present disclosure.

FIG. 1 illustrates an example network deployment consistent with the present disclosure. As illustrated in FIG. 1, the network 101 may include a plurality of network devices ND1 104-1, ND2 104-2, ND3 104-3, ND4 104-4, ND5 104-5, ND6 104-6, ND7 104-7, ND8 104-8, and ND9 104-9. The plurality of network devices ND1 to ND 9 104-1 to 104-9 are collectively referred to as network devices 104. The plurality of network devices 104 can be deployed in a network. Network deployment can refer to a process of setting up or initializing a new network device and/or computer system to make it available for use in a network or available for productive work in a live network environment. Deployment can include processes involved in getting new software and/or hardware associated with the deployed device up and running properly in the network environment, which can include installation, configuration, running, testing, making changes, etc. As a network device is deployed within the network, the device can be available for use. Deployment of a network device can take a particular period of time to deploy based on a number of network characteristics, a type of the device, and/or a server associated with the network device once it is within the network.

In some examples, a particular deployment time for a network device can be determined in order to assess whether the network device is being deployed within a particular deployment threshold. For example, in response to the network device taking longer than the deployment threshold, an indication that the network device is taking too long to deploy can be determined. In response to the network device taking less time than the deployment threshold, an indication that the network device was deployed within an acceptable time period can be determined. However, determining a same deployment threshold for all network devices in a network can be can make it difficult for each network device to run as efficiently. For example, different network devices may experience different deployment times and this may be based on different characteristics of each network device.

The dotted lines indicate network devices that are within a same server. For example, ND1 104-1, ND2 104-2, ND3 104-3, ND4 104-4, and ND5 104-5 are within a first server 102-1 of a network. Or, put another way, ND1 through ND 5 104-1 to 104-5 can be deployed in association with a first server. ND6 104-6 and ND7 104-7 can be deployed in association with a second server 102-2 and ND8 104-8 and ND9 104-9 can be deployed in association with a third server 102-3. Further, each of the network devices 104-1 to 104-9 can be of a particular network device type. For example, ND1 104-1, ND4 104-4 and ND6 104-6 can be of a first network device type. ND 2 104-2, ND5 104-5 can be of a second network device and so forth.

In some examples, each type of network device can be deployed in a different way and may experience different deployment times. In this way, it may be beneficial to determine a different deployment threshold for each type of network device. Further, it can be beneficial to determine a different deployment threshold for each type of server that each deployed network device is associated with. As an example, a first deployment threshold can be determined for ND1 104-1, ND4 104-4, and ND6 104-6, where ND 104-1, ND4 104-4, and ND6 104-6 are each associated with the first network device type. A second deployment threshold can be determined for ND2 104-2, ND5 104-5, where ND2 104-2, ND5 104-5 are each associated with the second network device type, and so forth.

In some examples, network devices deployed in association with different servers (and/or server types) can be deployed in different ways and experience different deployment times. In this way it may be beneficial to determine different deployment thresholds for network devices associated with different servers. For example, ND1 through ND 5 104-1 to 104-5 can be associated with a first deployment threshold, ND6 104-6 and ND7 104-7 can be associated with a second deployment threshold, and so forth.

In addition, a network device of a particular type and associated with a same server can be associated with a same deployment threshold. For example, ND1 104-1, ND4 104-4, and ND6 104-6 is of a first network device type but only ND1 104-1 and ND 4 104-4 are associated with the first server 102-1. Therefore, ND1 104-1 and ND4 104-4 can be associated with a same deployment threshold while ND6 104-6 can be associated with a different deployment threshold in order to assign a proper deployment threshold to each network device.

Figure 2:
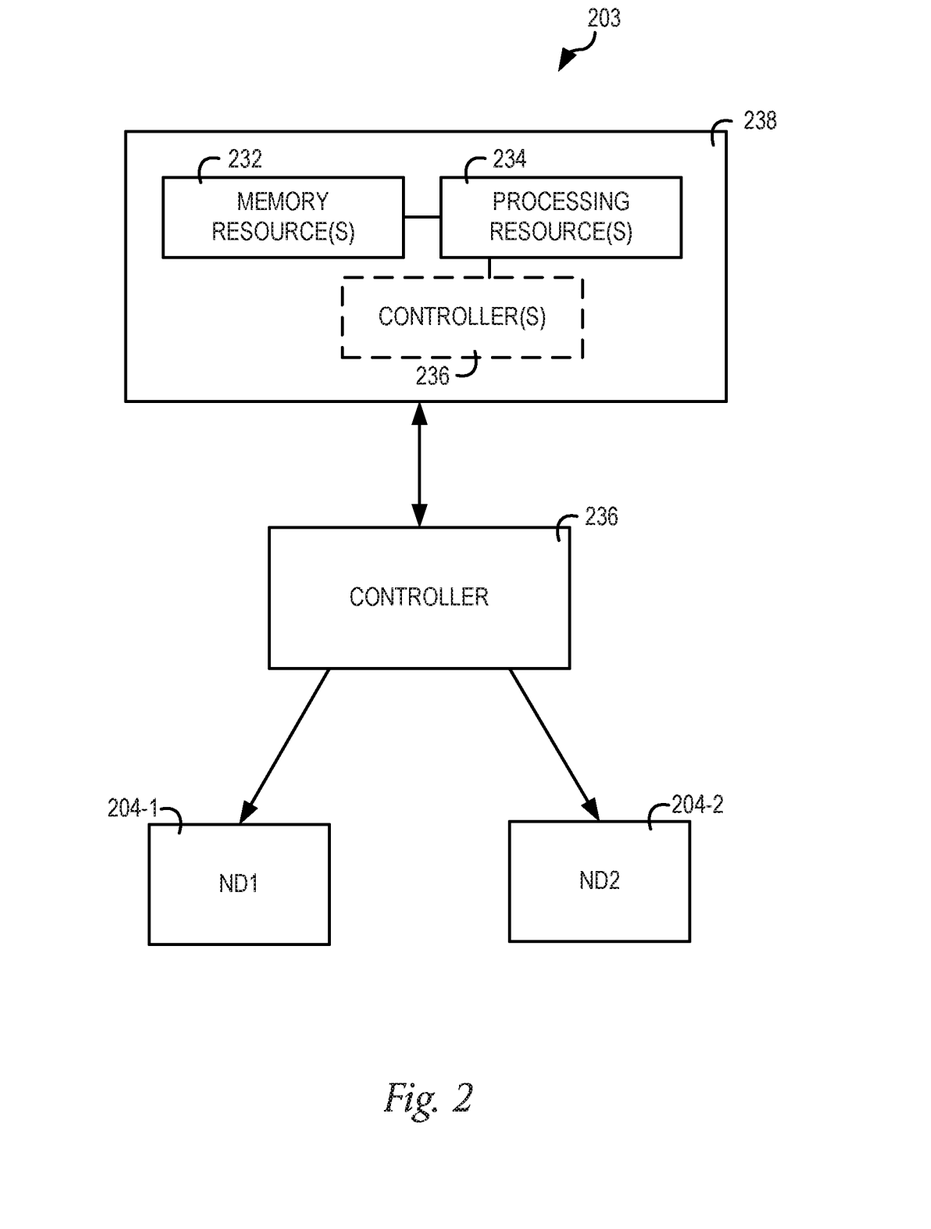
FIG. 2 illustrates an example diagram of a network system consistent with the present disclosure.

FIG. 2 illustrates an example diagram of a network system consistent with the present disclosure. As shown in FIG. 2, the network system 203 may include a network device manager 238, a controller 236, and a number of network devices (e.g., APs, servers, routers, controllers, etc.) ND1 204-1, ND2 204-2. The network device manager 238 can include a memory resource(s) 232, processing resource(s) 234 (and, optionally, indicated by a dotted box, a controller 236 within the network device manager). By way of example, the memory resource(s) 232 may include volatile and/or non-volatile memory, and the processing resource(s) 234 may include processors, microprocessors, etc.

In some examples, the processing resource(s) 234 and/or controller(s) 236 may process and/or control data received from the network devices ND1 204-1, ND2 204-2. The memory resource 232 can be used to store data related to deployment of network devices. The memory resource 232 can be used to store instructions executed by the processing resource 234 to perform a number of operations as described herein. The network device manager 238 can receive data from the network devices ND1 204-1, ND2 204-2 associated with characteristics such as their network device type, an associated server of the network device, etc.

In some examples, the processing resource(s) 234 and/or controller(s) 236 may determine a deployment threshold associated with a subset of a plurality of network devices (such as network devices associated with a first server 102-1 in FIG. 1). In the example of FIG. 2, this can be referred to as controller deployment control as the controller 236 is controlling and/or monitoring the deployment data and deployment thresholds associated with the network devices ND1 204-1 and ND2 204-2. The processing resource(s) 234 and/or controller(s) 236 may determine a network device type of each of the network devices ND1 204-1 and ND2 204-2. The processing resource(s) 234 and/or controller 236 may determine an adjustment to at least one deployment threshold in response to a change in the network characteristics. For example, as a greater number of network devices are added to the network, a timing of the deployment of particular network devices may change. In response to this change, the deployment threshold may be adjusted to account for changes in the network. For example, if a greater number of network devices are being deployed that are outliers of the deployment threshold (e.g., taking more time to deploy than the deployment threshold time), the deployment threshold may be modified to a greater deployment threshold period of time to accommodate for such a change in the network.

Figure 3:
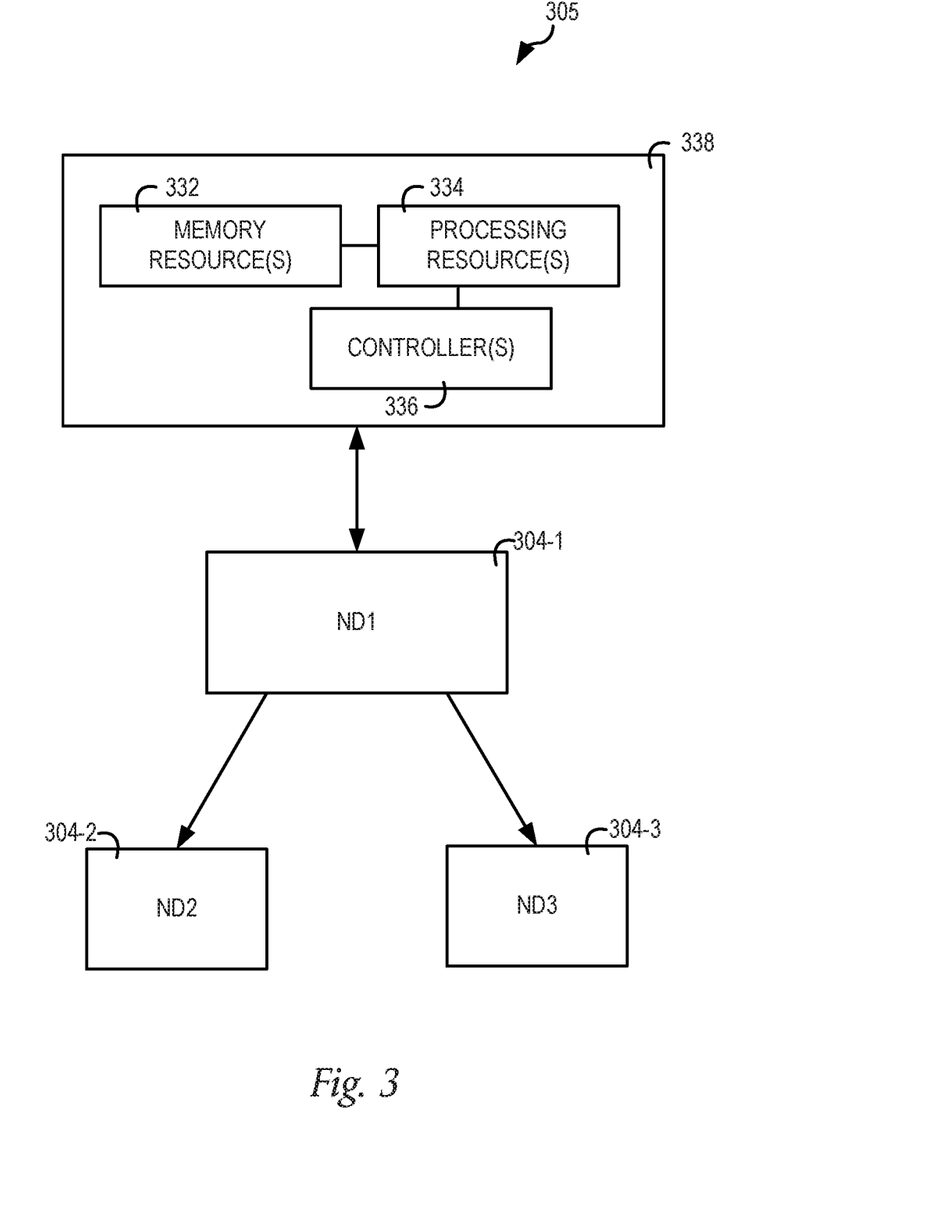
FIG. 3 illustrates an example diagram of a network system consistent with the present disclosure.

FIG. 3 illustrates an example diagram of a network system 305 consistent with the present disclosure. As shown in FIG. 3, the network system 305 may include a network device manager 338, a controller 336, and a number of network devices (e.g., APs, servers, routers, controllers, etc.) ND1 304-1, ND2 304-2, ND3 304-3. The network device manager 338 can include a memory resource(s) 332, processing resource(s) 334, and a controller 336 within the network device manager 338. By way of example, the memory resource(s) 332 may include volatile and/or non-volatile memory, and the processing resource(s) 334 may include processors, microprocessors, etc.

In some examples, the processing resource(s) 334 and/or controller(s) 336 may process and/or control data received from the network devices ND1 304-1, ND2 304-2, ND3 304-3. The memory resource 332 can be used to store data related to regions of network devices. The memory resource 332 can be used to store instructions executed by the processing resource 334 to perform a number of operations as described herein. The network device manager 338 can receive data from the network devices ND1 304-1, ND2 304-2, ND3 304-3 associated with characteristics such as their network device type, an associated server of the network device, etc. As is illustrated in FIG. 3, a first network device ND1 304-1 can be controlling a number of network devices ND2 304-2, ND3 304-3, and can receive data associated with the number of network devices. The network device ND1 304-1 can be determining a number of deployment thresholds and perform adjustments to the number of deployment thresholds. This can be referred to as network device deployment control and/or AP deployment control (in the case that the network device ND1 304-1 is an AP).

In some examples, the network device ND1 304-1 may determine a deployment threshold associated with a subset of a plurality of network devices (such as network devices associated with a first server 102-1 in FIG. 1). The network device ND1 304-1 may determine a network device type of each of the network devices ND2 304-2 and ND3 304-3. The network device ND1 304-1 may determine an adjustment to at least one deployment threshold in response to a change in the network characteristics. For example, as a greater number of network devices are added to the network, a timing of the deployment of particular network devices may change. In response to this change, the deployment threshold may be adjusted to account for changes in the network. For example, if a greater number of network devices are being deployed that are outliers of the deployment threshold (e.g., taking more time to deploy than the deployment threshold time), the deployment threshold may be modified to a greater deployment threshold period of time to accommodate for such a change in the network.

Figure 4:
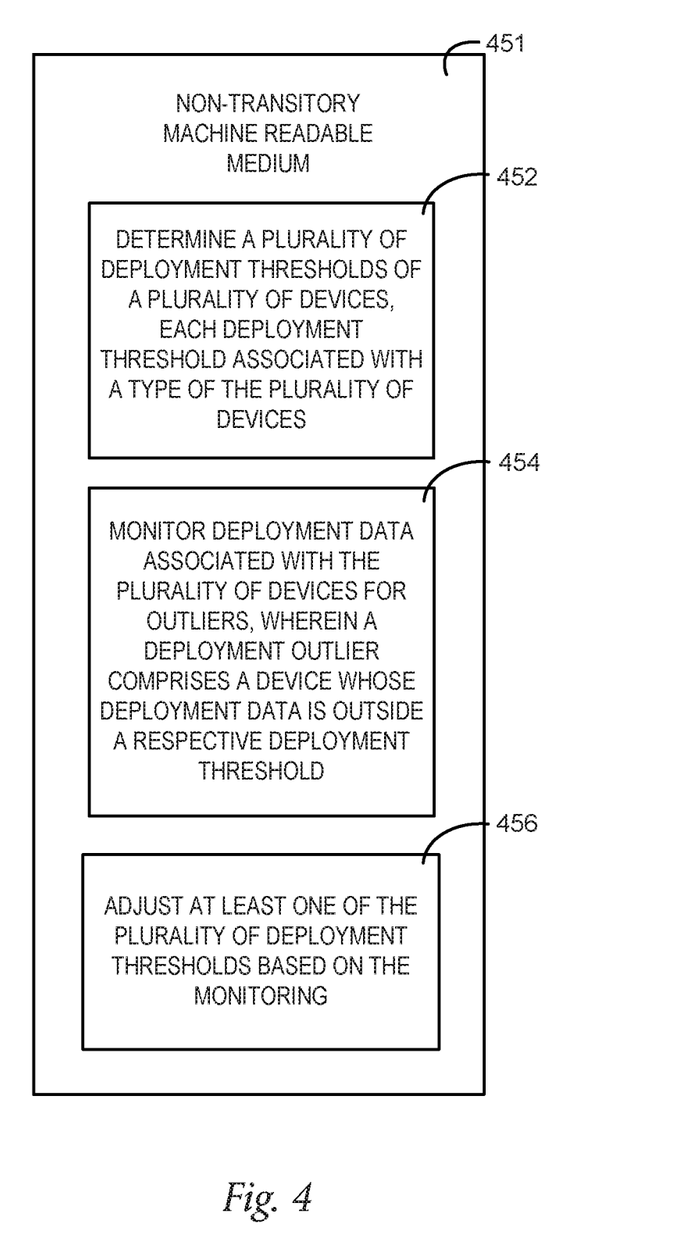
FIG. 4 illustrates a diagram of an example of a non-transitory machine readable medium and processing resource consistent with the present disclosure.

FIG. 4 illustrates a diagram of an example of a non-transitory machine readable medium 451 consistent with the present disclosure. A processing resource (such as processing resource 234 in FIGS. 2 and 334 in FIG. 3) may execute instructions stored on the non-transitory machine readable medium 451. The non-transitory machine readable medium 451 may be any type of volatile or non-volatile memory or storage, such as random access memory (RAM), flash memory, read-only memory (ROM), storage volumes, a hard disk, or a combination thereof.

The example medium 451 may store instructions 452 executable by a processing resource to determine a plurality of deployment thresholds of a plurality of devices. Each deployment threshold can be associated with a type of the plurality of devices.

In some examples, the example medium 451 may store instructions 454 executable by a processing resource to monitor deployment data associated with the plurality of devices to identify a device with a deployment outlier. A deployment outlier can include a device whose deployment data is outside a respective deployment threshold. For example, a first device can be of a first type of device. The first type of device can be associated with a deployment threshold of 0.5 seconds and the device can be deployed in 0.75 seconds. In this example, the first device can be an outlier because its deployment time is outside the deployment threshold. In addition, deployment data can be outside of a range of the deployment threshold in order to be an outlier. For example, a percentage of time outside, above or below, the deployment time period can be indicated by a deployment outlier.

The example medium 451 may store instructions 456 executable by a processing resource to adjust at least one of the plurality of deployment thresholds based on the monitoring. For example, a plurality of additional devices can be of the first type of device. The plurality of additional devices can include a number of outliers that are above a threshold number of outliers. The number of outliers of the plurality of additional devices can take longer to deploy than a corresponding deployment threshold. The deployment threshold associated with the first type of device can be adjusted to a longer deployment threshold time in order to compensate for the outliers.

The example medium 451 may store instructions executable by the processing resource to determine the plurality of deployment thresholds based on a type of server of each of the plurality of devices. As described in association with FIG. 1, each of the deployment thresholds can be associated with a particular type of server that the device is deployed on. The example medium 451 may store instructions executable by the processing resource to monitor deployment data by determining a duration that the deployment data is received during. For example, the duration can include a particular number of hours of monitoring, a particular number of days of monitoring, etc.

The example medium 451 may store instructions executable by the processing resource to monitor deployment data by determining a particular point in time that the deployment data is received. For example, the particular point in time can include a weekday, a weekend, etc. The particular point in time can include a holiday period of time, a vacation period of time, etc.

Figure 5:
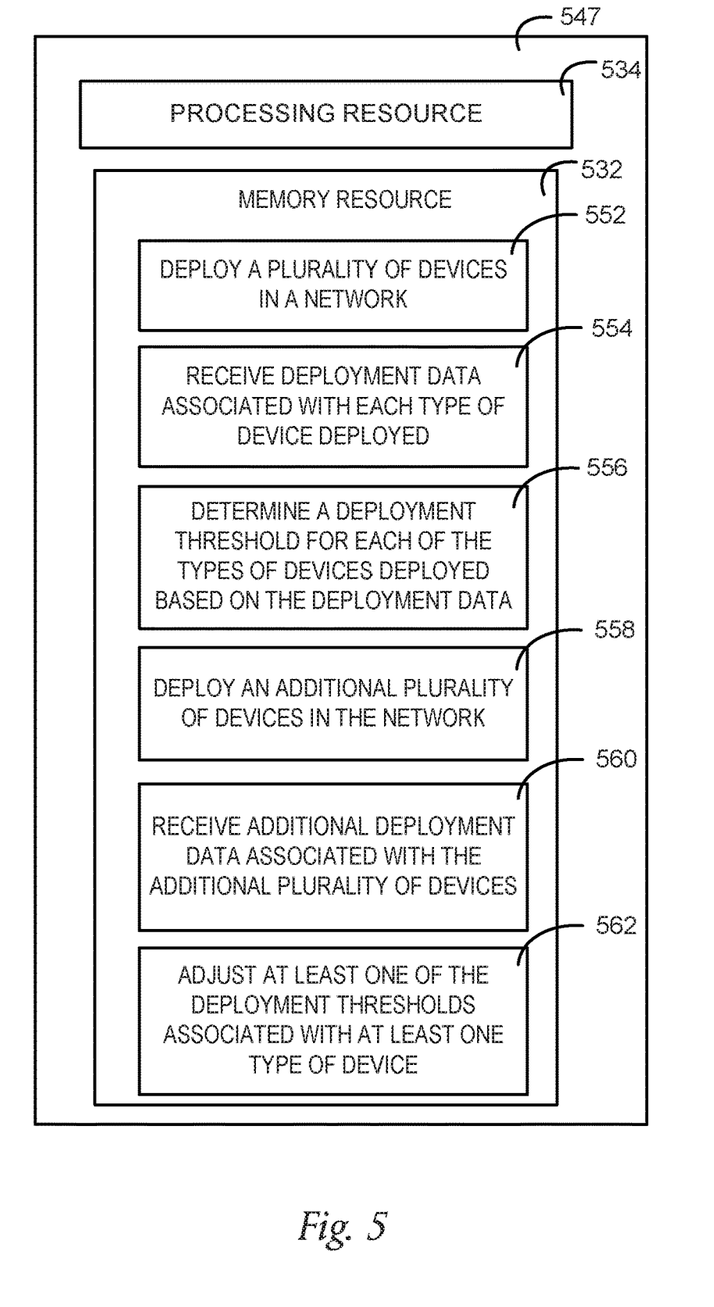
FIG. 5 illustrates a diagram of an example apparatus consistent with the present disclosure.

FIG. 5 illustrates a diagram of an example apparatus 547 consistent with the present disclosure. The example apparatus 547 can include a processing resource 534 and a memory resource 532. The processing resource 534 may execute instructions stored on the memory resource 532. The memory resource 532 may be any type of volatile or non-volatile memory or storage, such as random access memory (RAM), flash memory, read-only memory (ROM), storage volumes, a hard disk, or a combination thereof.

The memory resource 532 may store instructions 552 executable by a processing resource 534 to deploy a plurality of devices in a network. The plurality of devices deployed in the network can include an AP, a server, a switch, a controller, etc. In some examples, the memory resource 532 may store instructions 554 executable by a processing resource 534 to receive deployment data associated with each type of device deployed. The deployment data can indicate an amount of time that each device of each device type takes to be deployed into the network.

In some examples, the memory resource 532 may store instructions 556 executable by a processing resource 534 to determine initial deployment thresholds for the types of devices deployed based on the deployment data. For example, the deployment thresholds can be determined based on deployment data indicating an average of deployment times for each type of device. The deployment thresholds can be determined based on deployment data indicating a particular percentage of devices of a device type that are deployed within the deployment threshold amount of time.

The memory resource 532 may store instructions 558 executable by a processing resource 534 to deploy an additional plurality of devices in the network using the initial deployment thresholds. In some examples, the additional plurality of devices can be of the same types of devices as the devices previously deployed. In some examples, the additional plurality of devices can be of a different type of devices as the devices previously deployed.

The memory resource 532 may store instructions 560 executable by a processing resource 534 to receive additional deployment data associated with the additional plurality of devices. The additional deployment data can be updated deployment data for devices that may have been previously deployed in the network, leaves the network, and redeploys into the network. The additional deployment data can be updated deployment data for devices that have not been previously deployed in the network.

The memory resource 532 may store instructions 562 executable by a processing resource 534 to adjust at least one of the initial deployment thresholds associated with at least one type of device of a secondary deployment threshold using the additional deployment data. For example, an initial, previously determined threshold can be adjusted based on devices that are deployed with different deployment data outcomes (e.g., that take longer or shorter amounts of time to deploy than when the initial threshold was determined) and can cause the deployment thresholds to be less effective in deploying devices into the network in its current state. Devices of the at least one type that are deployed subsequent to the adjusting, using instructions 562, can have the secondary deployment threshold applied to the devices.

The memory resource 532 may store instructions executable by a processing resource 534 to determine the deployment threshold for each of a plurality of on-boarding stages. On-boarding stages can refer to different stages that devices go through during deployment into the network. For example, the plurality of on-boarding stages can include an association stage, an authentication stage, a dynamic host configuration protocol (DHCP) stage, a domain name server (DNS) stage, etc. The memory resource 532 may store instructions executable by a processing resource 534 to deploy the plurality of devices on more than one DHCP server and more than one DNS server. The at least one of the deployment thresholds can be associated with each DHCP server and each DNS server.

Figure 6:
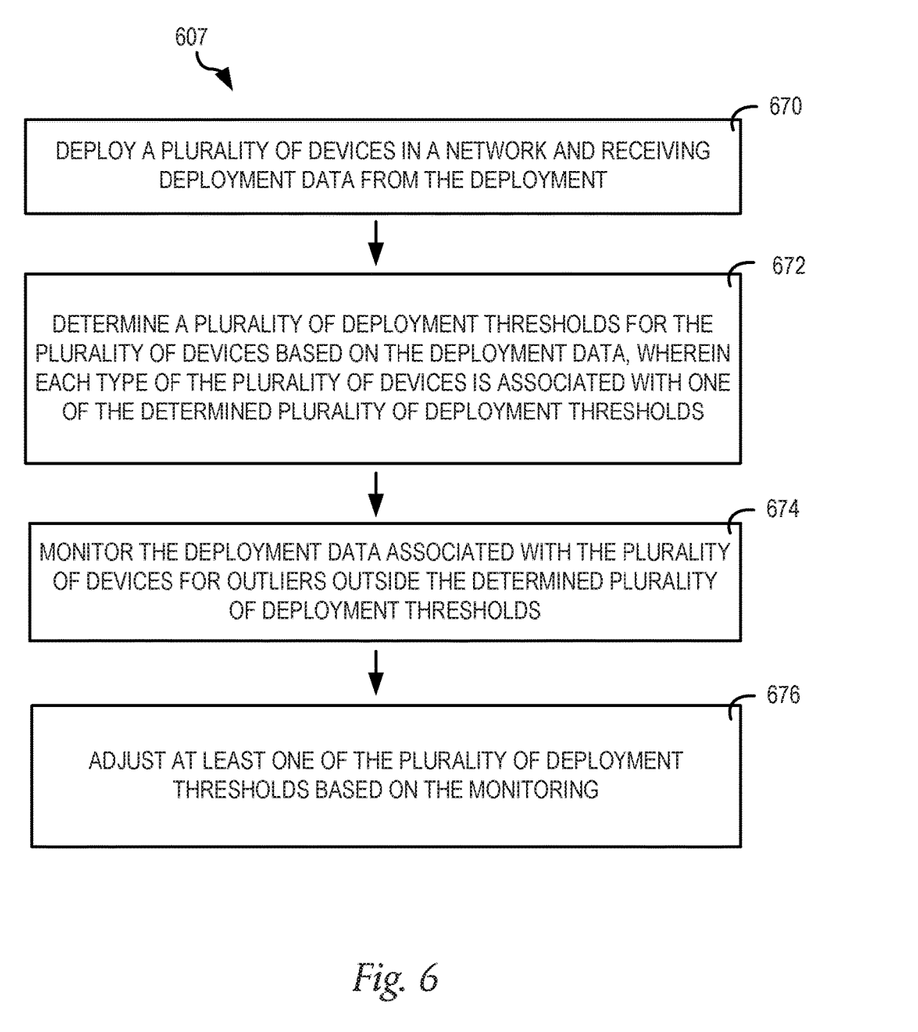
FIG. 6 illustrates a flow diagram for an example method for network deployment consistent with the present disclosure.

FIG. 6 illustrates a flow diagram for an example method 607 for network deployment consistent with the present disclosure. At 670, the method 607 includes deploying a plurality of devices in a network and receiving deployment data from the deployment. At 672, the method 607 includes determining a plurality of deployment thresholds for the plurality of devices based on the deployment data. Each type of the plurality of devices can be associated with a corresponding deployment threshold of the plurality of deployment thresholds.

At 674, the method 607 includes monitoring the deployment data associated with the plurality of devices for devices that include deployment data that is outside a range of a corresponding deployment threshold. A device that is outside a range of a corresponding deployment threshold can be referred to as an outlier. For example, a device with a deployment threshold that is above a deployment threshold and outside a range around the deployment threshold amount can be considered above the range. A device with a deployment threshold that is below the deployment threshold and outside the range can be considered below the range.

At 676, the method 607 includes adjusting at least one of the plurality of deployment thresholds based on the monitoring. The method 607 can include adjusting the at least one of the plurality of deployment thresholds is in response to a device of the plurality of devices including the deployment data that is outside the range by a particular percentage. The method 607 can include adjusting the at least one of the plurality of deployment thresholds in response to a group of subsequently deployed devices of one type including a greater number of devices with deployment data outside the range than a group of previously deployed devices of the one type. A previous deployment threshold for the one type of device can be applied to a group of previously deployed devices and an adjusted deployment threshold can be applied to the subsequently deployed devices, along with devices yet to be deployed.

The method 607 can include adjusting the at least one of the plurality of deployment thresholds in response to a particular percentage of data points of the deployment data associated with one type of the plurality of devices being a particular percentage above its corresponding deployment threshold. The particular percentage of data points can be between 60 and 80 percent. The method 607 can include adjusting the at least one of the plurality of deployment thresholds in response to a particular percentage of data points of the deployment data associated with one type of the plurality of devices being a particular percentage below its corresponding deployment threshold.

In this way, dynamic deployment thresholds can be determined in order to adapt deployment of devices into the network based on changing characteristics and/or deployment data as additional devices are deployed into the network. Rather than a static deployment threshold for all types of devices and all types of servers of the network, a plurality of deployment thresholds can allow for more flexibility and adaptability of deployment of devices. The network can deploy devise in a more efficient manner and speed and effectiveness of deploying devices can be increased.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designators "N", "M", "P", "R", "S", and "T", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

What is claimed:

1. A method for network deployment, comprising:
   monitoring a plurality of deployment times, including a deployment time of a first network device, for a plurality of network devices, including the first network device, that are deployed in the network;
   determining that the deployment time is greater or less than an initial time threshold for the first network device based on an average of the plurality of deployment times, and the initial time threshold;
   determining a secondary time threshold based on the determination that the deployment time is greater or less than the initial time threshold; and
   deploying a second network device in the network using the secondary time threshold.

2. The method of claim 1, wherein the first network device is of a device type, and wherein the second network device is of the device type.

3. The method of claim 1, wherein the first network device is of a device type, and wherein the second network device is of a different device type than the device type.

4. The method of claim 1, comprising:
   removing the first network device from the network; and
   re-deploying the first network device in the network using the secondary time threshold.

5. The method of claim 1, wherein the deployment time is less than the initial time threshold, and wherein the secondary time threshold is less than the initial time threshold.

6. The method of claim 1, comprising determining the initial time threshold based on a type of server in the network.

7. The method of claim 1, comprising determining the initial time threshold based on a type of the network.

8. The method of claim 1, comprising:
   determining the initial time threshold based on an average amount of time to deploy a plurality of network devices of a device type of the first network device in the network.

9. An apparatus for network deployment, comprising:
   a processing resource; and
   a memory resource storing machine-readable instructions to cause the processing resource to:
   monitor a deployment time of a first network device that is deployed in a network;
   determine that the deployment time is greater or less than an initial time threshold for the first network device based on the deployment time, and the initial time threshold;
   determine a secondary time threshold based on the determination that the deployment time is greater or less than the initial time threshold;
   deploy a second network device in the network using the secondary time threshold;
   remove the first network device from the network; and
   re-deploy the first network device in the network using the secondary time threshold.

10. The apparatus of claim 9, wherein the first network device is of a device type, and wherein the second network device is of the device type.

11. The apparatus of claim 9, wherein the first network device is of a device type, and wherein the second network device is of a different device type than the device type.

12. The apparatus of claim 9, wherein the first network device is of a device type, and wherein the machine-readable instructions cause the processing resource to determine the initial time threshold based on an average amount of time to deploy a plurality of network devices of the device type in the network.

13. The apparatus of claim 9, wherein the deployment time is less than the initial time threshold, and wherein the secondary time threshold is less than the initial time threshold.

14. The apparatus of claim 9, wherein the machine-readable instructions cause the processing resource to determine the initial time threshold based on a type of the network.

15. The apparatus of claim 9, wherein the machine-readable instructions cause the processing resource to:
   determine the initial time threshold based on an average amount of time to deploy a plurality of network devices of a device type of the first network device in the network.

16. A non-transitory computer-readable medium storing instructions executable by a processor to cause the processor to:
   determine an initial time threshold for deploying a first network device of a device type in a network based on an average amount of time to deploy a plurality of network devices of the device type in the network;
   monitor a deployment time of the first network device in the network;
   determine that the deployment time is greater or less than the initial time threshold based on the deployment time and the initial time threshold;
   determine a secondary time threshold for the device type based on the determination that the deployment time is greater or less than the initial time threshold;
   deploy a second network device in the network using the secondary time threshold, wherein the second network device is of the device type;

remove the first network device from the network; and
re-deploy the first network device in the network using the secondary time threshold.

17. The medium of claim 16, wherein the deployment time is less than the initial time threshold, and wherein the secondary time threshold is less than the initial time threshold.

18. The medium of claim 16, wherein the instructions cause the processor to determine the initial time threshold based on a type of the network.

19. The medium of claim 16, wherein the first network device is of a device type, and wherein the second network device is of the device type.

20. The medium of claim 16, wherein the first network device is of a device type, and wherein the second network device is of a different device type than the device type.

* * * * *